US012804546B2

(12) United States Patent
He

(10) Patent No.: US 12,804,546 B2
(45) Date of Patent: Nov. 17, 2026

(54) METHOD FOR DETERMINING TRANSMISSION RESOURCE FOR POWER SAVING SIGNAL, TERMINAL DEVICE, CHIP AND STORAGE MEDIUM

(71) Applicant: GUANGDONG OPPO MOBILE TELECOMMUNICATIONS CORP., LTD., Dongguan (CN)

(72) Inventor: Chuanfeng He, Dongguan (CN)

(73) Assignee: GUANGDONG OPPO MOBILE TELECOMMMUNICATIONS CORP., LTD., Dongguan (CN)

( * ) Notice: Subject to any disclaimer, the term of this patent is extended or adjusted under 35 U.S.C. 154(b) by 298 days.

(21) Appl. No.: 18/420,118

(22) Filed: Jan. 23, 2024

(65) Prior Publication Data

US 2024/0172121 A1 May 23, 2024

Related U.S. Application Data

(63) Continuation of application No. PCT/CN2021/114703, filed on Aug. 26, 2021.

(51) Int. Cl.

| | |
|---|---|
| ***H04W 52/02*** | (2009.01) |
| ***H04W 24/08*** | (2009.01) |
| ***H04W 68/02*** | (2009.01) |
| ***H04W 76/28*** | (2018.01) |

(52) U.S. Cl.

CPC ....... *H04W 52/0235* (2013.01); *H04W 24/08* (2013.01); *H04W 68/02* (2013.01); *H04W 76/28* (2018.02)

(58) Field of Classification Search

CPC . H04W 52/0235; H04W 24/08; H04W 68/02; H04W 76/28; H04W 52/0216; H04W 52/0229; H04W 52/02; Y02D 30/70

See application file for complete search history.

(56) References Cited

U.S. PATENT DOCUMENTS

| | | | | |
|---|---|---|---|---|
| 2022/0232478 | A1* | 7/2022 | Huang | H04W 52/028 |
| 2022/0295405 | A1* | 9/2022 | Seo | H04W 52/0235 |
| 2022/0408515 | A1* | 12/2022 | Li | H04W 52/0229 |
| 2023/0337180 | A1* | 10/2023 | Park | H04W 68/005 |
| 2023/0388927 | A1* | 11/2023 | Yang | H04L 5/0091 |

(Continued)

FOREIGN PATENT DOCUMENTS

| | | | |
|---|---|---|---|
| CN | 112752330 | A | 5/2021 |
| CN | 113163476 | A | 7/2021 |

(Continued)

OTHER PUBLICATIONS

International Search Report in the international application No. PCT/CN2021/114703, mailed on Apr. 26, 2022. 5 pages with English translation.

(Continued)

*Primary Examiner* — Schquita D Goodwin
(74) *Attorney, Agent, or Firm* — Ladas & Parry LLP

(57) ABSTRACT

A method for determining a transmission resource for a power saving signal, a terminal device, a chip and a storage medium are provided. The method includes: the terminal device determines a target monitoring occasion set for the power saving signal, here, the target monitoring occasion set comprises S monitoring occasions, and S is a positive integer.

20 Claims, 8 Drawing Sheets

(56) References Cited

U.S. PATENT DOCUMENTS

| | | | | |
|---|---|---|---|---|
| 2024/0014870 | A1 * | 1/2024 | Ben Hadj Fredj | H04B 7/0639 |
| 2024/0073862 | A1 * | 2/2024 | Kaikkonen | H04W 68/02 |
| 2024/0259998 | A1 * | 8/2024 | Peng | H04B 7/0626 |
| 2024/0267884 | A1 * | 8/2024 | Ly | H04W 68/005 |

FOREIGN PATENT DOCUMENTS

| | | | |
|---|---|---|---|
| WO | 2020166925 | A1 | 8/2020 |
| WO | 2021089801 | A1 | 5/2021 |
| WO | 2021175032 | A1 | 9/2021 |

OTHER PUBLICATIONS

Written Opinion of the International Search Authority in the international application No. PCT/CN2021/114703, mailed on Apr. 26, 2022. 8 pages with English translation.

3GPP TS 38.304 V16.0.0 (Mar. 2020), 3rd Generation Partnership Project; Technical Specification Group Radio Access Network; NR; User Equipment (UE) procedures in Idle mode and RRC Inactive state (Release 16). chapter 7.1. 36 pages.

3GPP TS 38.213 V16.2.0 (Jun. 2020), 3rd Generation Partnership Project; Technical Specification Group Radio Access Network; NR; Physical layer procedures for control (Release 16). chapter 10.3. 176 pages.

3GPP TS 38.331 V16.3.1 (Jan. 2021), 3rd Generation Partnership Project; Technical Specification Group Radio Access Network; NR; Radio Resource Control (RRC) protocol specification (Release 16). pp. 343-665. 929 pages.

3GPP TS 38.331 V16.1.0 (Jul. 2020), 3rd Generation Partnership Project; Technical Specification Group Radio Access Network; NR; Radio Resource Control (RRC) protocol specification (Release 16). p. 421. 902 pages.

3GPP TSG RAN WG1 #106-e R1-2106898, e-Meeting, Aug. 16-27, 2021, Agenda Item: 8.7.1.1, Source: Samsung, Title: Discussion on paging enhancements, Document for: Discussion and decision. section 2. 9 pages.

* cited by examiner

METHOD FOR DETERMINING TRANSMISSION RESOURCE FOR POWER SAVING SIGNAL, TERMINAL DEVICE, CHIP AND STORAGE MEDIUM

CROSS-REFERENCE TO RELATED APPLICATION(S)

This application is a continuation of International Patent Application No. PCT/CN2021/114703 filed on Aug. 26, 2021, the entire contents of which are incorporated by reference herein in its entirety.

BACKGROUND

In a paging mechanism, in order to optimize power saving of a terminal device, the concept of a power saving signal is introduced. The power saving signal is located before a Paging Occasion (PO) and indicates whether the terminal device monitors a Physical Downlink Control Channel (PDCCH) for paging on the PO.

However, for monitoring occasions for the power saving signal, at present, there is no relevant solution on how to determine a transmission resource for the power saving signal, which results in that the terminal device cannot effectively perform reception of the power saving signal.

SUMMARY

Embodiments of the present disclosure relates to the field of mobile communication technologies, and provide a method for determining a transmission resource for a power saving signal, a terminal device, a chip, a non-transitory computer-readable storage medium.

In a first aspect, an embodiment of the present disclosure provides a method for determining a transmission resource for a power saving signal, which includes the following operations.

A terminal device determines a target monitoring occasion set for the power saving signal. The target monitoring occasion set includes S monitoring occasions, and S is a positive integer.

In a second aspect, an embodiment of the present disclosure provides a terminal device, which includes a processor and a memory for storing a computer program that, when executed by the processor, causes the processor to determine a target monitoring occasion set for a power saving signal. The target monitoring occasion set includes S monitoring occasions, and S is a positive integer.

In third aspect, an embodiment of the present disclosure provides a chip, which includes a processor configured to invoke and run a computer program from a memory to cause a terminal device installed with the chip to perform the following operations including determining a target monitoring occasion set for a power saving signal. The target monitoring occasion set includes S monitoring occasions, and S is a positive integer.

In a fourth aspect, an embodiment of the present disclosure provides a non-transitory computer-readable storage medium storing a computer program that, when executed, causes a computer to perform the method in the first aspect.

BRIEF DESCRIPTION OF THE DRAWINGS

The drawings illustrated in the present disclosure are used to provide a further understanding of the present disclosure and constitute a part of the present disclosure. The illustrative embodiments of the present disclosure and the description thereof are used to explain the present disclosure, rather than constituting unduly limitation on the present disclosure. In the drawings.

DETAILED DESCRIPTION

The technical solutions of the embodiments of the present disclosure will be described below in conjunction with the drawings in the embodiments of the present disclosure, and it is apparent that the described embodiments are part of the embodiments of the present disclosure, but not all of the embodiments of the present disclosure. Based on the embodiments in the present disclosure, all other embodiments obtained by those of ordinary skill in the art without making creative efforts fall within the scope of protection of the present disclosure.

Figure 1:
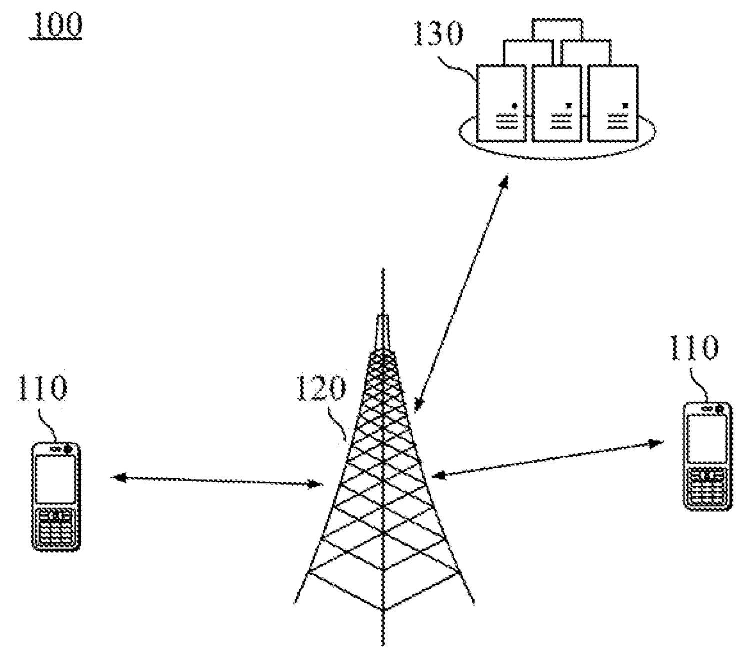
FIG. 1 is a diagram of an application scenario according to an embodiment of the present disclosure.

FIG. 1 is a diagram of an application scenario according to an embodiment of the present disclosure.

As illustrated in FIG. 1, a communication system 100 may include a terminal device 110 and a network device 120. The network device 120 may communicate with the terminal device 110 through an air interface. Multi-service transmission is supported between the terminal device 110 and the network device 120.

It should be understood that the embodiments of the present disclosure are exemplarily illustrated only by taking the communication system 100 as an example, but the present disclosure is not limited thereto. That is, the technical solutions of the embodiments of the present disclosure can be applied to various communication systems, such as: a Long Term Evolution (LTE) system, a LTE Time Division Duplex (TDD), an Universal Mobile Telecommunications System (UMTS), an Internet of Things (IoT) system, a Narrow Band Internet of Things (NB-IoT) system, an enhanced Machine-Type Communications (eMTC) system, a 5G communication system (also called New Radio (NR) communication system), or a future communication system, and the like.

In the communication system 100 illustrated in FIG. 1, the network device 120 may be an access network device that communicates with the terminal device 110. The access network device may provide communication coverage for a particular geographic area and may communicate with the terminal device 110 (e.g., a UE) located within the coverage area.

The network device 120 may be an Evolutional Node B (eNB or eNodeB) in a Long Term Evolution (LTE) system, a Next Generation Radio Access Network (NG RAN) device, a base station (gNB) in an NR system, or a wireless controller in a Cloud Radio Access Network (CRAN). Alternatively, the network device 120 may be a relay station, an access point, a vehicle-mounted device, a wearable device, a hub, a switch, a bridge, a router, or a network device in a future evolved Public Land Mobile Network (PLMN), or the like.

The terminal device 110 may be any terminal device including but not limited to a terminal device in wired or wireless connection with network device 120 or other terminal devices.

For example, the terminal device 110 may refer to an access terminal, User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular telephone, a cordless telephone, a Session Initiation Protocol (SIP) telephone, an IoT device, a satellite handheld terminal, a Wireless Local Loop (WLL) station, a Personal Digital Assistant (PDA), a handheld device having a wireless communication function, a computing device or other processing device connected to a wireless modem, a vehicle-mounted device, a wearable device, a terminal device in a 5G network or a terminal device in a future evolution network, or the like.

The terminal device 110 may be used for Device to Device (D2D) communication.

The wireless communication system 100 may further include a core network device 130 that communicates with a base station. The core network device 130 may be a 5G Core (5GC) device, for example, an Access and Mobility Management Function (AMF), for another example, an Authentication Server Function (AUSF), for another example, a User Plane Function (UPF), and for another example, a Session Management Function (SMF). In an embodiment, the core network device 130 may also be an Evolved Packet Core (EPC) device of an LTE network, for example, a Session Management Function+Core Packet Gateway (SMF+PGW-C) device. It should be understood that SMF+PGW-C can simultaneously achieve functions capable of being achieved by SMF and PGW-C respectively. In the process of network evolution, the core network device may also be called by other names, or a new network entity may be formed by dividing the functions of the core network, which is not limited by the embodiments of the present disclosure.

The connection(s) can be established between functional units in the communication system 100 through a next generation (NG) interface to realize communication.

For example, the terminal device establishes an air interface connection with the access network device through an NR interface for transmission of user plane data and control plane signaling. The terminal device can establish a control plane signaling connection with an AMF through an NG interface 1 (N1 for short). The access network device, such as a next generation radio access base station (gNB), may establish a user plane data connection with a UPF through an NG interface 3 (N3 for short). The access network device can establish a control plane signaling connection with the AMF through an NG interface 2 (N2 for short). The UPF can establish a control plane signaling connection with an SMF through an NG interface 4 (N4 for short). The UPF can interact user plane data with a data network through an NG interface 6 (N6 for short). The AMF can establish a control plane signaling connection with the SMF through an NG interface 11 (N11 for short). The SMF can establish a control plane signaling connection with a policy control function (PCF) through an NG Interface 7 (N7 for short).

FIG. 1 exemplarily illustrates one base station, one core network device and two terminal devices. In an embodiment, the wireless communication system 100 may include multiple base stations and other numbers of terminal devices may be included within the coverage area of each base station, which is not limited by the embodiments of the present disclosure.

It should be noted that FIG. 1 only illustrates, by way of example, the system applicable to the present disclosure. Of course, the methods illustrated in the embodiments of the present disclosure may also be applicable to other systems. In addition, the terms "system" and "network" are commonly used interchangeably in the present disclosure. The term "and/or" in the present disclosure is only an association relationship describing associated objects, which means that there may be three relationships. For example, "A and/or B" may mean three situations: A exists alone, A and B exist at the same time and B exists alone. In addition, the character "/" herein generally indicates that the associated objects before and after the character "/" are in an "or" relationship. It should also be understood that the reference to "indication" in the embodiments of the present disclosure may be a direct indication, or may be an indirect indication, or may be indicative of an association. For example, "A indicates B" may mean that A directly indicates B, for example, B can be obtained through A. "A indicates B" may also mean that A indirectly indicates B, for example, A indicates C, and B can be obtained by C. "A indicates B" may also mean that there is an association between A and B. It should also be understood that the reference to "correspondence" in the embodiments of the present disclosure may mean that there is a direct or indirect corresponding relationship between the two, or may mean that there is an association relationship between the two, or may be a relationship between indication and being indicated, configuration and being configured, or the like. It should also be understood that the "predefinition" or "predefined rules" referred to in the embodiments of the present disclosure may be implemented by pre-storing corresponding codes, tables, or other means that may be used to indicate relevant information in devices (e.g., including terminal devices and network devices), the specific implementation of which is not limited by the present disclosure. For example, predefinition can refer to definition in the protocol. It should also be understood that in the embodiments of the present disclosure, the "protocol" may refer to standard protocols in the communication field, such as the LTE protocol, the NR protocol, and related protocols applied in future communication systems, which are not limited in the present disclosure.

In order to facilitate understanding of the technical solutions of the embodiments of the present disclosure, the following related technologies of the embodiments of the present disclosure are described, and the following related technologies, which used as optional solutions, can be arbitrarily combined with the technical solutions of the embodiments of the present disclosure, all of which belong to the protection scope of the embodiments of the present disclosure.

Discontinuous Reception (DRX)

In order to reduce the power consumption of the terminal device, a DRX mechanism is introduced, which makes the terminal device enter a discontinuous reception state without keeping its receiver on all the time when there is no data reception, and thus achieving the purpose of saving power. In the DRX mechanism, a DRX cycle is configured for the terminal device in a Radio Resource Control (RRC) connected state, and the DRX cycle consists of "On Duration (corresponding to DRX active time)" and "Opportunity for DRX (corresponding to DRX inactive time)". During the "On Duration", the terminal device monitors and receives downlink channels and signals including PDCCH; and during the "Opportunity for DRX", the terminal device does not receive the downlink channels and signals, such as PDCCH, to reduce power consumption. The terminal device in an RRC idle state needs to receive a paging message in a way similar to the DRX mechanism. There is a Paging Occasion (PO) in a DRX cycle, and the terminal device only monitors, in the PO, a paging PDCCH (i.e., PDCCH for paging) and the paging message, but does not monitor, in the time outside of the PO, the paging PDCCH and does not receive the paging message, so as to achieve the purpose of saving power. During the PO, the terminal device determines whether there is a paging message, by detecting the paging PDCCH scrambled with a Paging-Radio Network Temporary Identity (P-RNTI).

In the evolution of the 5G, higher requirements are put forward for power saving of the terminal device. For example, for the existing DRX mechanism, during each On Duration, the terminal device needs to constantly detect the PDCCH to determine whether the base station schedules data transmission that is sent to the terminal device itself. However, for most terminal devices, there may be no need to receive data transmission for a long time, but a regular wake-up mechanism still needs to be maintained to monitor possible downlink transmission. For such terminal devices, there is room for further optimization on power saving. The same is true for the terminal device in the RRC idle state receiving the paging message.

Figure 2:
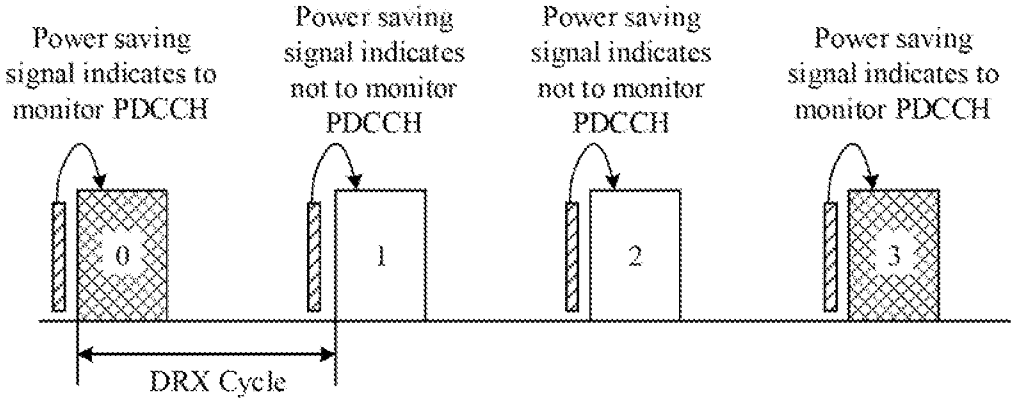
FIG. 2 is a diagram illustrating that a power saving signal indicates whether to monitor PDCCH, according to an embodiment of the present disclosure.

In order to optimize the power saving of the terminal device, a power saving signal is introduced. The power saving signal is used in conjunction with the DRX mechanism, and the terminal device receives the power saving signal before the On Duration. When there is data transmission for the terminal device during a DRX cycle, the power saving signal "wakes up" the terminal device to monitor the PDCCH during the On Duration. Otherwise, when there is no data transmission for the terminal device during a DRX cycle, the power saving signal does not "wake up" the terminal device, and the terminal device does not need to monitor the PDCCH during the On Duration. Compared with the existing DRX mechanism, when there is no data transmission for the terminal device, the PDCCH monitoring during the On Duration can be omitted for the terminal device, thus realizing power saving. The time when the terminal device is outside of the On Duration is referred to as the DRX inactive time, and the time when the terminal device is during the On Duration is referred to as the DRX active time. In an example, the process of indicating, by the power saving signal, whether the terminal device monitors the PDCCH during the On Duration is illustrated in FIG. 2.

Figure 3:
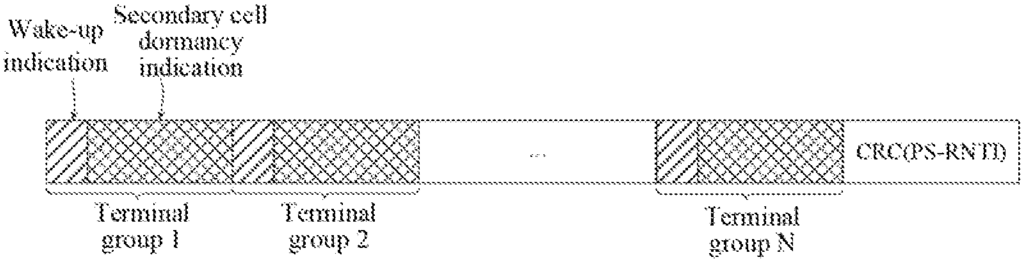
FIG. 3 is a diagram illustrating that a power saving wake-up signal carries power saving indication information for multiple users, according to an embodiment of the present disclosure.

The power saving signal can be carried by the newly defined Downlink Control Information (DCI) format 2_6. The network configures search space sets for the terminal device to detect the PDCCH carrying the DCI format 2_6. In the power saving signal, the number of bits required by a single user is at most 6, including 1 wake-up indication bit and at most 5 secondary cell dormancy indication bits. The power saving signal carries indication bits for multiple users to improve resource utilization efficiency. As illustrated in FIG. 3, the network notifies a start position of power saving indication bits for each user in the DCI, and the number of bits for a single user can be implicitly obtained from the configured number of secondary cell (carrier) groups (the wake-up indication bit must appear, and the number of secondary cell (carrier) dormancy indication bits can be 0). Further, the network notifies the terminal device of the total number of bits of the DCI and the Power Saving-Radio Network Temporary Identity (PS-RNTI) for scrambling the PDCCH.

There is a certain timing relationship between a monitoring occasion for the PDCCH (PDCCH monitoring occasion for short) and a time window of the On Duration (i.e., DRX On Duration, or DRX On). The network configures a time offset Power Saving-offset (PS-offset) which is used to determine a start point of the PDCCH monitoring occasion. After determining the start point of the PDCCH monitoring occasion, an end point of the PDCCH monitoring occasion also needs to be determined, and the end point of the PDCCH monitoring occasion is determined based on the device capability of the terminal device. The terminal device needs to perform the operations of device waking up and initialization after waking up and the like in the minimum time interval before the On Duration, so that the terminal device does not need to monitor the power saving signal in the minimum time interval before the On Duration. A shorter minimum time interval can be used for terminals with a faster speed of processing, as shown in value 1 in the table below, while a longer minimum time interval is required for terminals with a slower speed of processing, as shown in value 2 in the table below.

TABLE 1

| | Minimum time interval (slots) | |
|---|---|---|
| Subcarrier spacing (kHz) | Value 1 | Value 2 |
| 15 | 1 | 3 |
| 30 | 1 | 6 |
| 60 | 1 | 12 |
| 120 | 2 | 24 |

Figure 4:
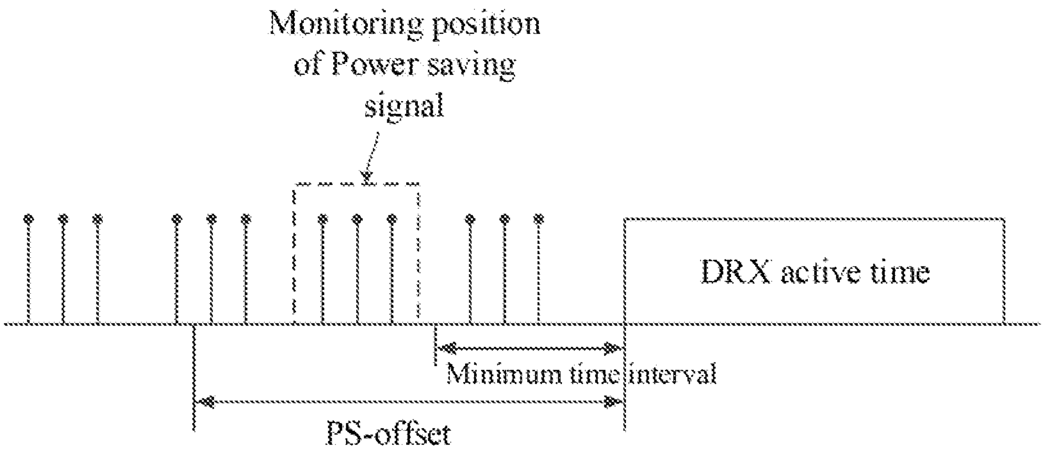
FIG. 4 is a diagram of a monitoring position of a power saving signal according to an embodiment of the present disclosure.

For the power saving signal, a time position indicated by the PS-offset configured by the network is taken as a start point, the power saving signal is monitored within a complete PDCCH monitoring occasion (the PDCCH monitoring occasion is defined by a parameter "duration" of a PDCCH search space) after the start point, and a position of the monitored power saving signal is before a time period corresponding to the minimum time interval. As illustrated in FIG. 4, the terminal device monitors the power saving signal at a monitoring position indicated by a dashed line box. A monitoring position indicated by the dashed line box is the complete PDCCH monitoring occasion after the time position indicated by the PS-offset as the start point.

Paging

In the NR system, the network may send paging to the terminal devices in an RRC idle state and in an RRC inactive state. A paging process can be triggered by the core network or the base station, so as to send paging requests to the terminal devices in the RRC idle state and in the RRC inactive state, or to notify system information updates and notify the terminal devices to receive information such as Earthquake and Tsunami Warning System (ETWS) information and Commercial Mobile Alert System (CMAS) information. After receiving a paging message from the core network, the base station interprets contents of the paging message to obtain a Tracking Area Identity (TAI) list (i.e., TA list) of the terminal device, and performs air interface paging in a cell of the base station belonging to a tracking area in the list. A core network domain in the paging message will not be decoded at the base station, but transparently transmitted to the terminal device. After receiving paging messages from the core network, the base station aggregates paging messages for terminal devices with the same PO into one piece of paging message which is transmitted to the relevant terminal devices through paging channel(s). The terminal device receives a paging parameter through a system message, calculates a PO in combination with its own UE_ID, and receives the paging message on the corresponding PO. The paging message is carried by a Physical Downlink Shared CHannel (PDSCH), and the terminal device obtains paging indication information by detecting the PDCCH scrambled with the P-RNTI, so as to receive the paging message. The terminal device in the RRC idle state will save power by means of DRX, and the PDCCH scrambled with the P-RNTI is monitored on a PO in a Paging Frame (PF) in a DRX cycle, so as to receive the paging message. The terminal device obtains DRX related configuration information from a System Information Block (SIB) 2.

The PF indicates a system frame number on which the paging message should appear, and the PO indicates a possible moment of occurrence. A PF may include one or more POs, and the terminal device only needs to monitor a PO belonging to the terminal device itself in each DRX cycle or Paging Cycle.

A System Frame Number (SFN) satisfying the following formula can be used as a PF frame.

$$(\mathrm{SFN}+\mathrm{PF\_offset}) \bmod T=(T \operatorname{div} N)*(\mathrm{UE\_ID} \bmod N)$$

Figure 5:
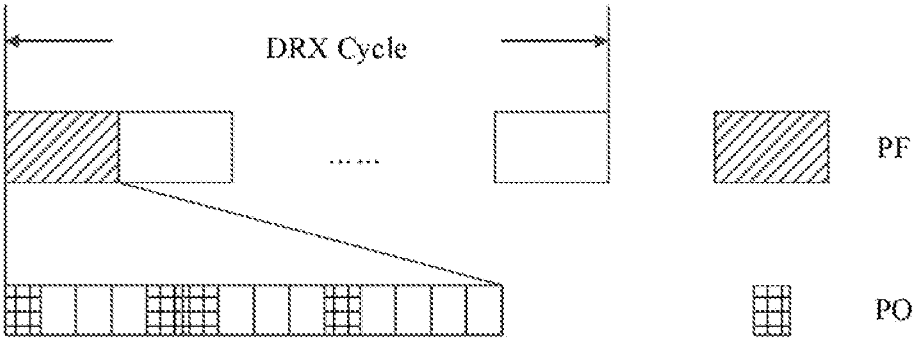
FIG. 5 is a diagram of Paging Frame (PF) and PO according to an embodiment of the present disclosure.

Within the PF, the index (i.e., i_s) of the PO corresponding to the terminal device can be calculated according to the following formula.

$$i\_s=\mathrm{floor}(\mathrm{UE\_ID}/N) \bmod Ns$$

Where T represents a DRX cycle of the terminal device. If a default DRX cycle indicated in the system message is denoted as T_sib, if a DRX value T_ue of the terminal device has been configured, then T=min (T_ue, T_sib); and if T_ue is not configured, a default value indicated in the system message is used, i.e., T=T_sib. UE_ID=(5G-Serving-Temporary Mobile Subscriber Identity (5G-S-TMSI) mod 1024), and 5G-S-TMSI is identity information of the terminal device. N is the number of PFs in T. Ns is the number of POs in a PF. PF_offset is a frame offset used to determine the PF. As an example, the position of the PF within a DRX cycle and the position of the PO within the PF are illustrated in FIG. 5.

Figure 6:
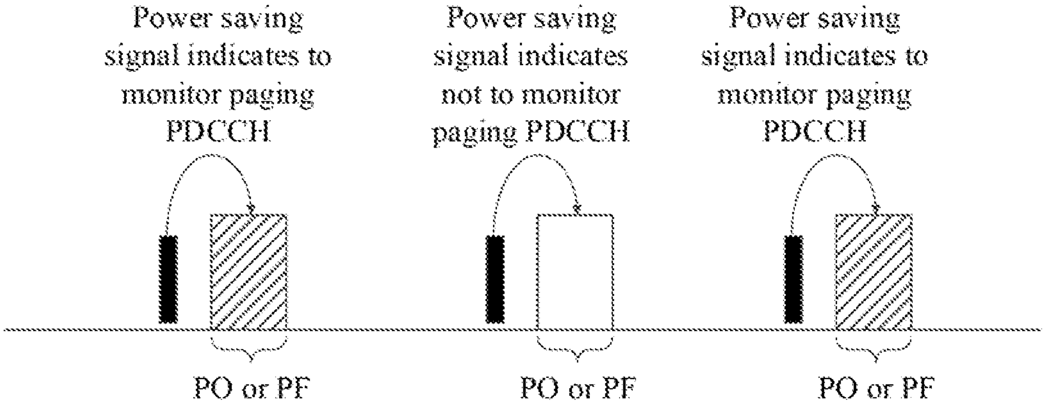
FIG. 6 is a diagram illustrating that a power saving signal indicates whether to monitor PDCCH for paging, according to an embodiment of the present disclosure.

The terminal device in the RRC idle state periodically monitors the paging PDCCH on the PO corresponding to the terminal device itself. However, in the actual situation, the probability of the terminal device being paged may not be high. The terminal device periodically monitors the paging PDCCH on the corresponding PO, but the paging PDCCH sent to the terminal device is not monitored, which will cause waste of power. Similar to the power saving of the terminal device in the RRC connected state, the power saving of the terminal device in the RRC idle state receiving the paging message is optimized, and a similar power saving signal is introduced. A power saving signal is called Paging Early Indication (PEI) which is used to indicate whether the terminal device monitors the paging PDCCH on a target PO before the target PO arrives. The power saving signal may be a sequence-based signal or a PDCCH-based signal. Use of the PDCCH to carry the power saving signal can follow the existing PDCCH design, so it is easy to be compatible and multiplexed with existing systems and other channels. The power saving signal based on the PDCCH may also carry more power saving information, such as carrying sub-grouping information for indicating the sub-grouping corresponding to the power saving information. Here, the sub-grouping is the further grouping of multiple terminal devices that correspond to one PO calculated based on the UE_ID, and the sub-grouping information combined with the power saving information can indicate more finely terminal device(s) for which whether paging needs to be received on the target PO. As illustrated in FIG. 6, a power saving signal indicates whether one or more sub-groups of terminal devices monitor the paging PDCCH on the corresponding PF or PO.

In the NR technology, for the terminal device in the RRC idle state, the base station does not know which beam is used to send paging for the terminal device, so the paging is sent in a beam sweeping manner. To support multi-beam transmission of the paging, a PO is defined as a set of PDCCH monitoring occasions, and a PF may contain one or more POs or one or more start time points of PO(s). When the SearchSpaceId of the paging search space is equal to 0, since the index of each synchronization signal block (i.e., Synchronization Signal/Physical Broadcast Channel Block, SS/PBCH block, also called SSB) corresponds to a PDCCH monitoring occasion, and different SSB indexes correspond to different beams, multi-beam transmission of the paging can be supported by multiple PDCCH monitoring occasions, corresponding to different SSB indexes, in a PO. When the SearchSpaceId of the paging search space is not equal to 0, a PO contains "S*X" consecutive PDCCH monitoring occasions, where S is the number of SSBs actually transmitted, and S is indicated by ssb-PositionsInBurst information in an SIB1; X denotes the number of PDCCH monitoring occasions corresponding to each SSB, and X is indicated by nrofPDCCH-MonitoringOccasionPerSSB-InPO information. When the parameter X is not configured, a value of X is 1. For the [x*S+K]-th PDCCH monitoring occasion in a PO, which corresponds to the K-th actually transmitted SSB, where x=0, 1, . . . , X−1, K=1, 2, . . . , S. For example, if S=8 and X=2, a PO contains 16 PDCCH monitoring occasions, and SSB indexes corresponding to the 16 PDCCH monitoring occasions in a time order is "0123456701234567", among which index numbers of 8 SSBs are 0 to 7.

For the terminal devices in the RRC idle state and in the RRC inactive state, the main power consumption lies in periodic reception of the paging message. How to design the terminal devices in the RRC idle state and in RRC inactive state to receive the power saving signal is a problem to be solved. One way is to employ a power saving signal, such as PEI, for indicating, prior to the arrival of a target PO, whether a terminal device monitors a paging PDCCH on the target PO, where the paging PDCCH is used for scheduling the paging message. The power saving signal can be carried by a PDCCH, or carried by a reference signal or a synchronization signal. How to determine a transmission resource for the power saving signal needs to be clarified. Therefore, the following technical solutions of the embodiments of the present disclosure are proposed.

In order to facilitate understanding of the technical solutions of the embodiments of the present disclosure, the technical solutions of the present disclosure will be described in detail below through specific embodiments. The above related technologies, which used as optional solutions, can be arbitrarily combined with the technical solutions of the embodiments of the present disclosure, all of which belong to the protection scope of the embodiments of the present disclosure. The embodiments of the present disclosure include at least part of the following contents.

Figure 7:
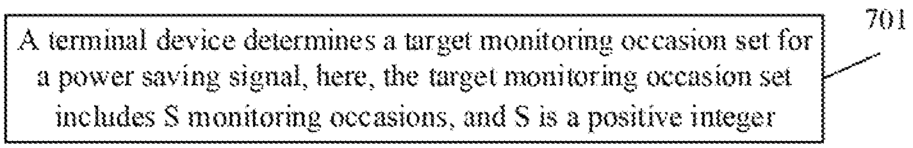
FIG. 7 is a flowchart of a method for determining a transmission resource for a power saving signal according to an embodiment of the present disclosure.

FIG. 7 is a flowchart of a method for determining a transmission resource for a power saving signal according to an embodiment of the present disclosure. As illustrated in FIG. 7, the method for determining the transmission resource for the power saving signal includes the following operation.

At 701, a terminal device determines a target monitoring occasion set for the power saving signal. The target monitoring occasion set includes S monitoring occasions, and S is a positive integer.

In the embodiment of the present disclosure, the target monitoring occasion set is a monitoring occasion set where the terminal device needs to perform monitoring. In some alternative embodiments, after determining the target monitoring occasion set, the terminal device monitors the power saving signal on all or part of the monitoring occasions in the target monitoring occasion set.

In the embodiment of the present disclosure, the target monitoring occasion set includes the S monitoring occasions, and a value of S can be network-configured or predefined. In some alternative embodiments, the value of S corresponds to the number of SSBs actually transmitted. As an example, the value of S is indicated by ssb-PositionsInBurst information in an SIB1.

Here, the S monitoring occasions in the target monitoring occasion set are associated with S beams. Each of the S monitoring occasions is associated with a beam, or each of the S monitoring occasions is associated with a reference signal index (SSB index).

In some alternative embodiments, the S monitoring occasions in the target monitoring occasion set may be numbered, for example, starting from 0, and indexes of the S monitoring occasions are 0, 1, 2, . . . , S−1, respectively.

In the embodiment of the present disclosure, a complete monitoring occasion set needs to include S monitoring occasions. In other words, a monitoring occasion set including S monitoring occasions is called the complete monitoring occasion set. In the following solutions, unless otherwise specified, the monitoring occasion set refers to the complete monitoring occasion set.

In some alternative embodiments, the power saving signal is a PEI signal. It should be noted that the name of the power saving signal is not limited in the present disclosure.

It should be noted that the monitoring occasion in the embodiments of the present disclosure refers to the monitoring occasion for the power saving signal. Taking the power saving signal as the PEI signal as an example, a monitoring occasion refers to a PEI monitoring occasion.

In some alternative embodiments, the power saving signal is carried by a PDCCH, and the monitoring occasion refers to a monitoring occasion for the PDCCH (referred to as PDCCH monitoring occasion for short).

In some alternative embodiments, the power saving signal is carried by a reference signal, and the monitoring occasion refers to a transmission occasion for the reference signal. Further, in an embodiment, the reference signal includes at least one of: a Tracking Reference Signal (TRS), a Channel State Information-Reference Signal (CSI-RS), or a Secondary Synchronization Signal (SSS).

In the embodiment of the present disclosure, the operation that the terminal device determines the target monitoring occasion set for the power saving signal can be understood as that the terminal device determines a position of the target monitoring occasion set for the power saving signal, such as a time domain position, which is explained below.

First Solution

In the embodiment of the present disclosure, the terminal device determines a target time window, and determines the S monitoring occasions within the target time window as the target monitoring occasion set.

Here, the target time window includes M monitoring occasions, and M is an integer greater than or equal to S.

In some alternative embodiments, when M equals to S, the terminal device determines all monitoring occasions (i.e., the S monitoring occasions) within the target time window as the target monitoring occasion set.

In some alternative embodiments, when M is greater than S, the terminal device determines S monitoring occasions from the M monitoring occasions within the target time window, and determines the S monitoring occasions as the target monitoring occasion set.

In some alternative embodiments, the terminal device may determine the S monitoring occasions from the M monitoring occasions within the target time window by the following manners.

First manner: the terminal device determines first S consecutive monitoring occasions from the M monitoring occasions within the target time window, and determines that the target monitoring occasion set includes the first S consecutive monitoring occasions.

As an example, the target time window includes 10 monitoring occasions (i.e., M=10) and S=8, and the first 8 consecutive monitoring occasions among these 10 monitoring occasions can be taken as the target monitoring occasion set.

Second manner: the terminal device determines last S consecutive monitoring occasions from the M monitoring occasions within the target time window, and determines that the target monitoring occasion set includes the last S consecutive monitoring occasions.

As an example, the target time window includes 10 monitoring occasions (i.e., M=10) and S=8, and the last 8 consecutive monitoring occasions among these 10 monitoring occasions can be taken as the target monitoring occasion set.

Second Solution

In the embodiment of the present disclosure, the terminal device determines a first target monitoring occasion, here, the first target monitoring occasion being the first monitoring occasion in the target monitoring occasion set; and the terminal device determines that the target monitoring occasion set includes S consecutive monitoring occasions starting from the first monitoring occasion.

Herein, a position of the first target monitoring occasion may be network-configured. The terminal device takes the S consecutive monitoring occasions starting from the first target monitoring occasion as the target monitoring occasion set.

Third Solution

In the embodiment of the present disclosure, the terminal device receives first configuration information, here, the first configuration information is used to determine multiple monitoring occasion sets in a time cycle; and the terminal device determines the target monitoring occasion set from the multiple monitoring occasion sets.

In some alternative embodiments, the first configuration information is carried in a system message, such as an SIB1.

In some alternative embodiments, the time cycle is a DRX cycle or a paging cycle.

In the embodiment of the present disclosure, the first configuration information is used to determine multiple monitoring occasion sets in a time cycle, and the implementation of the first configuration information is described below.

First manner: the first configuration information includes at least one of: first information for indicating a number of the monitoring occasion sets included in the time cycle; second information for indicating a first monitoring occasion in each of the multiple monitoring occasion sets; or third information for indicating a number of monitoring occasions included in each of the multiple monitoring occasion sets.

As an example, the first configuration information includes first information, second information, and third information. The first information indicates that the number of the monitoring occasion sets included in the time cycle is 3. For convenience of description, the 3 monitoring occasion sets are referred to as a monitoring occasion set 1, a monitoring occasion set 2 and a monitoring occasion set 3. The second information indicates that the first monitoring occasion in the monitoring occasion set 1 is a monitoring occasion X, the first monitoring occasion in the monitoring occasion set 2 is a monitoring occasion Y, and the first monitoring occasion in the monitoring occasion set 3 is a monitoring occasion Z. The third information indicates that the number of monitoring occasions included in each of the monitoring occasion sets is S. The terminal device can determine positions of the monitoring occasion set 1, the monitoring occasion set 2 and the monitoring occasion set 3 based on the first configuration information.

Second manner: the first configuration information includes at least one of: first information for indicating a number of the monitoring occasion sets included in the time cycle; third information for indicating a number of monitoring occasions included in each of the multiple monitoring occasion sets; fourth information for indicating a first monitoring occasion in a reference monitoring occasion set in the multiple monitoring occasion sets; or fifth information for indicating a positional relationship between the reference monitoring occasion set and another monitoring occasion set other than the reference monitoring occasion set, in the multiple monitoring occasion sets.

As an example, the first configuration information includes first information, third information, fourth information, and fifth information. The first information indicates that the number of the monitoring occasion sets included in the time cycle is 3. For convenience of description, the 3 monitoring occasion sets are referred to as a monitoring occasion set 1, a monitoring occasion set 2 and a monitoring occasion set 3. The third information indicates that the number of monitoring occasions included in each of the monitoring occasion sets is S. The fourth information indicates that the first monitoring occasion in the monitoring occasion set 1 (i.e., the reference monitoring occasion set) is a monitoring occasion X. The fifth information indicates a time interval between another set (e.g., the monitoring occasion set 2, the monitoring occasion set 3) and the monitoring occasion set 1. According to the fourth information and the fifth information, the terminal device can calculate a position of the first monitoring occasion in other sets (such as the monitoring occasion set 2 and the monitoring occasion set 3). For example, the terminal device can calculate that the first monitoring occasion in monitoring occasion set 2 is a monitoring occasion Y and the first monitoring occasion in the monitoring occasion set 3 is a monitoring occasion Z. Thus, the terminal device can determine, based on the first configuration information, the positions of the monitoring occasion set 1, the monitoring occasion set 2, and the monitoring occasion set 3. It should be noted that time intervals between adjacent monitoring occasion sets may be the same or different. If the time intervals are the same, the fifth information may give one interval value, and if the time intervals are different, the fifth information may give multiple interval values.

In the embodiment of the present disclosure, after determining the multiple monitoring occasion sets, the terminal device determines the target monitoring occasion set from the multiple monitoring occasion sets. In some alternative embodiments, the terminal device determines, based on a first time relationship, the target monitoring occasion set from the multiple monitoring occasion sets. The first time relationship is a time relationship between the target monitoring occasion set and a target paging unit or a time relationship between the target monitoring occasion set and a target SSB set. Specifically, the terminal device determines, based on the first time relationship as well as the target paging unit or the target SSB set, the target monitoring occasion set from the multiple monitoring occasion sets.

Option 1): the target monitoring occasion set is an L-th monitoring occasion set, located before the target paging unit, in the multiple monitoring occasion sets, and L is a positive integer.

In some alternative embodiments, a value of L is network-configured or predefined.

Option 2): the target monitoring occasion set is a nearest monitoring occasion set, located before the target SSB set, in the multiple monitoring occasion sets.

Option 3): the target monitoring occasion set is a nearest monitoring occasion set, located after the target SSB set, in the multiple monitoring occasion sets.

Fourth Solution

In the embodiment of the present disclosure, the terminal device determines a target time window, here, the target time window includes at least one monitoring occasion set; and the terminal device determines the target monitoring occasion set from the at least one monitoring occasion set within the target time window.

Here, it should be noted that the target time window includes at least one monitoring occasion set. In particular, the target time window includes at least one complete monitoring occasion set.

In some alternative embodiments, the terminal device determines that the target monitoring occasion set includes all of the at least one monitoring occasion set.

In some alternative embodiments, the terminal device determines that the target monitoring occasion set includes part of the at least one monitoring occasion set.

Here, it should be noted that the terminal device can take one or more monitoring occasion sets within the target time window as the target monitoring occasion set to be monitored.

In some alternative embodiments, the terminal device takes a monitoring occasion set within the target time window as the target monitoring occasion set to be monitored, by adopting the following manners.

First manner: the terminal device determines that the target monitoring occasion set is a first monitoring occasion set in the at least one monitoring occasion set.

Second manner: the terminal device determines that the target monitoring occasion set is a last monitoring occasion set in the at least one monitoring occasion set.

It should be noted that the above-mentioned first to the fourth solutions of the embodiments of the present disclosure can be implemented separately, or two or more solutions can be implemented in combination.

In the solutions of the embodiment of the present disclosure, the terminal device can determine the target time window in the following manner. The terminal device determines the target time window based on a first configuration parameter.

In some alternative embodiments, the first configuration parameter includes at least one of: a first parameter for determining a start time of the target time window; a second parameter for determining an end time of the target time window; or a third parameter for determining a duration of the target time window.

In some alternative embodiments, the first parameter is used to indicate an offset of the start time of the target time window relative to a reference time of a target paging unit. Alternatively, the first parameter is used to indicate an offset of the start time of the target time window relative to a reference time of a target SSB set.

In some alternative embodiments, the second parameter is used to indicate an offset of the end time of the target time window relative to a reference time of a target paging unit. Alternatively, the second parameter is used to indicate an offset of the end time of the target time window relative to a reference time of a target SSB set.

As an example, the first configuration parameter includes a first parameter and a second parameter. The first parameter is used to indicate an offset of a start time of the target time window relative to an end time of a target paging unit and the second parameter is used to indicate an offset of an end time of the target time window relative to the end time of the target paging unit. Alternatively, the first parameter is used to indicate an offset of a start time of the target time window relative to a start time of a target SSB set and the second parameter is used to indicate an offset of an end time of the target time window relative to an end time of the target SSB set.

As an example, the first configuration parameter includes a first parameter and a third parameter. The first parameter is used to indicate an offset of a start time of the target time window relative to an end time of a target paging unit or an offset of a start time of the target time window relative to a start time of a target SSB set, and the third parameter is used to indicate a duration of the target time window.

As an example, the first configuration parameter includes a second parameter and a third parameter. The second parameter is used to indicate an offset of an end time of the target time window relative to an end time of a target paging unit or an offset of an end time of the target time window relative to a start time of a target SSB set, and the third parameter is used to indicate a duration of the target time window.

In the solutions of the embodiments of the present disclosure, the terminal device can determine the target SSB set in the following manner. The terminal device determines the target SSB set based on a second time relationship. The second time relationship is a time relationship between the target SSB set and the target paging unit.

In some alternative embodiments, the target SSB set is an M-th SSB set before the target paging unit, and M is a positive integer.

In some alternative embodiments, P SSB sets exist between the target monitoring occasion set and the target paging unit, where P is a positive integer, M=P or M=P+1.

In some alternative embodiments, a value of M is network-configured or predefined.

In the solutions of the embodiments of the present disclosure, the target paging unit is a paging occasion (PO) or paging frame (PF) corresponding to the terminal device.

In some alternative embodiments, the terminal device may determine the SFN of the PF corresponding to the terminal device by the following formula: (SFN+PF_offset) mod T=(T div N)*(UE_ID mod N).

In some alternative embodiments, the terminal device may determine the index i_s of the PO corresponding to the terminal device by the following formula: i_s=floor (UE_ID/N) mod Ns.

In the above solutions, T represents a DRX cycle of the terminal device. If a default DRX cycle indicated in the system message is denoted as T_sib, if a DRX value T_ue of the terminal device has been configured, then T=min (T_ue, T_sib); and if T_ue is not configured, the default value indicated in the system message is used, i.e., T=T_sib.

In the above solutions, UE_ID is the UE_ID of the terminal device. In an embodiment, UE_ID=(5G-S-TMSI mod 1024), where 5G-S-TMSI is identity information of the terminal device.

In the above solutions, N is the number of PFs in T. Ns is the number of POs in a PF. PF_offset is a frame offset used to determine the PF.

The technical solutions of the embodiments of the present disclosure are illustrated with examples in combination with specific application examples. It should be noted that in the following application examples, both the situations where the paging unit is PO and the paging unit is PF are applicable to the following application examples. It should be noted that in the following application examples, the power saving signal is PEI as an example, and accordingly, the monitoring occasion can be called a PEI monitoring occasion.

First Application Example

In the embodiment of the present disclosure, S PEI monitoring occasions within the target time window are used as the target monitoring occasion set for the PEI.

For the PEI of the terminal device in the RRC idle state or RRC inactive state, multiple beams are required for transmission of the PEI. For example, in a manner similar to the monitoring occasion set, corresponding to multiple SSBs, in the PO, there are multiple monitoring occasions for the PEI, which correspond to multiple SSBs or correspond to multiple monitoring occasions in the PO. Therefore, the transmission and reception of the PEI correspond to a monitoring occasion set which includes at least S PEI monitoring occasions. In an embodiment, S is the number of SSBs actually transmitted, and S is indicated by ssb-PositionsInBurst information in an SIB1.

Figure 8:
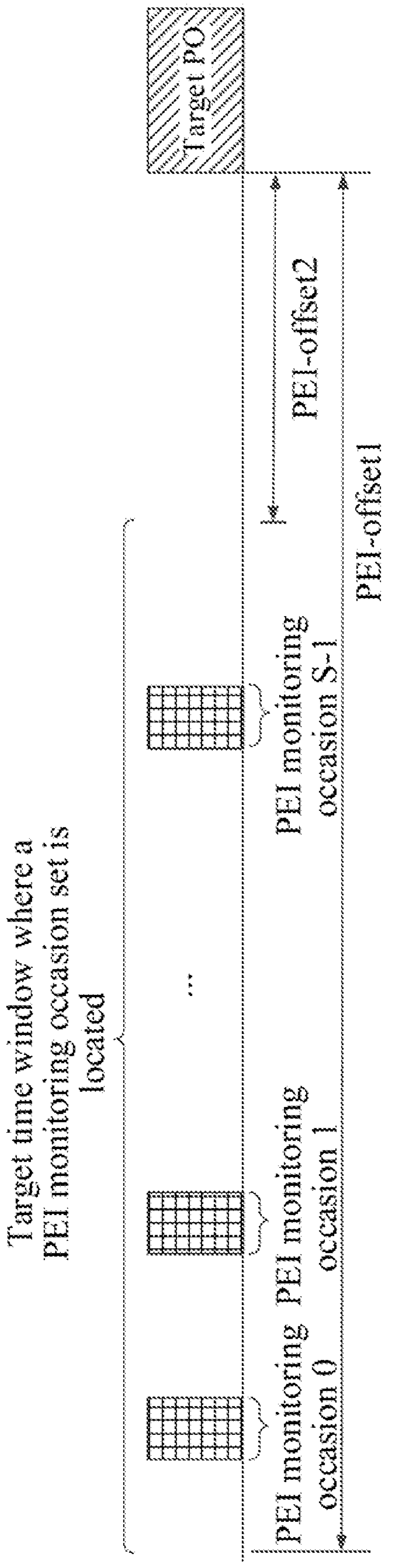
FIG. 8 is a first diagram of a Paging Early Indication (PEI) monitoring occasion set according to an embodiment of the present disclosure.

The PEI monitoring occasions are configured by a network. For example, the PEI is carried in a PDCCH, the network configures a search space for the PDCCH, and monitoring occasions for the PDCCH carrying the PEI (i.e., PEI monitoring occasions) are distributed in time according to the configuration of the search space. For the determination of the monitoring occasion set for the PEI (referred to as the PEI monitoring occasion set), a time offset between the PEI monitoring occasion set and a target PO can be defined. The time offset can include a minimum time offset which is generally related to the processing capacity of the terminal device and is a preparation time that needs to be reserved for the terminal device before the terminal device receives the paging at the target PO according to the PEI information. In addition, in the RRC idle state or the RRC inactive state, the terminal device also needs a certain time for time-frequency synchronization recovery before receiving the paging. Therefore, the time offset may further include a maximum time offset for determining a start point of the target time window where the terminal device monitors the PEI. As an example, as illustrated in FIG. 8, the network configures the parameters PEI-offset1 and PEI-offset2. PEI-offset1 is used to indicate an offset of a start time of the target time window where the PEI monitoring occasion set is located relative to a start time of the target PO. PEI-offset2 is used to indicate an offset of an end time of the target time window where the PEI monitoring occasion set is located relative to the start time of the target PO. The parameters PEI-offset1 and PEI-offset2 together determine the position of the target time window where the PEI monitoring occasion set is located.

Within the target time window, it is necessary to ensure that the number of PEI monitoring occasions is greater than or equal to the number of monitoring occasions for paging PDCCHs included in the target PO, or greater than or equal to the number (i.e., S) of actually transmitted SSBs which is indicated by ssb-PositionsInBurst information.

The target time window determined by the above solutions may not guarantee that the target time window only contains S PEI monitoring occasions. When the number of the PEI monitoring occasions contained within the target time window is more than S, the terminal device needs to determine S PEI monitoring occasions from all the PEI monitoring occasions contained within the target time window as the PEI monitoring occasion set to be monitored.

In the embodiment, the terminal device can select S PEI monitoring occasions within the target time window as the PEI monitoring occasion set to be monitored. In an embodiment, the first S consecutive PEI monitoring occasions within the target time window may be selected as the PEI monitoring occasion set. In an embodiment, the last S consecutive PEI monitoring occasions within the target time window may also be selected as the PEI monitoring occasion set.

Second Application Example

In the embodiment of the present disclosure, the first PEI monitoring occasion (referred to as an initial monitoring occasion) in the PEI monitoring occasion set is configured by the network. The target time window contains at least one complete PEI monitoring occasion set.

Figure 9:
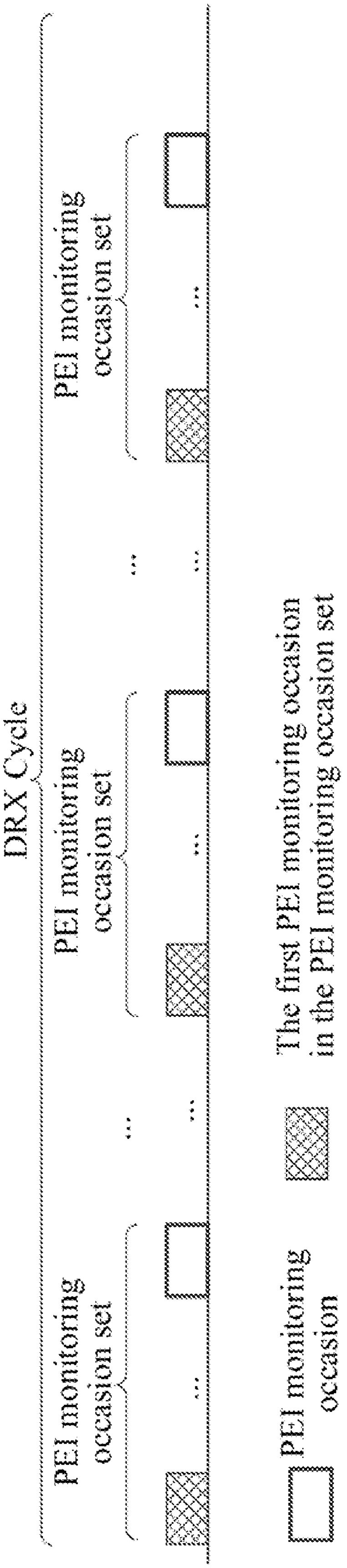
FIG. 9 is a second diagram of a PEI monitoring occasion set according to an embodiment of the present disclosure.

The network configures the PEI monitoring occasions. For example, the PEI is carried in a PDCCH, the network configures a search space for the PDCCH, and the monitoring occasions for the PDCCH carrying the PEI (i.e., PEI monitoring occasions) are distributed in time. Specifically, the network can configure a position of an initial monitoring occasion of a PEI monitoring occasion set in a DRX cycle or a paging cycle, and the PEI monitoring occasion set includes S consecutive PEI monitoring occasions starting from the initial monitoring occasion. Further, in an embodiment, the network can also configure several PEI monitoring occasion sets within a DRX cycle or a paging cycle, each of the PEI monitoring occasion sets corresponds to S consecutive PEI monitoring occasions starting from an initial monitoring occasion. With these configurations, the PEI monitoring occasions in time is configured into several PEI monitoring occasion sets, as illustrated in FIG. 9. In an embodiment, the configuration information may be carried by a system message (such as an SIB1).

For the manner of determining the PEI monitoring occasion set(s) by configuring the target time window by the network, in the embodiment, in combination with the configuration of the PEI monitoring occasion set(s) by the network, the target time window needs to contain at least one complete PEI monitoring occasion set. Different from the first application example, the first PEI monitoring occasion in the complete PEI monitoring occasion set may not be the first PEI monitoring occasion within the target time window. The target time window may include one or more complete PEI monitoring occasion sets. If the target time window contains multiple complete PEI monitoring occasion sets, the terminal device needs to select the target monitoring occasion set from the multiple PEI monitoring occasion sets as the PEI monitoring occasion set to be monitored. In an embodiment, the first complete PEI monitoring occasion set within the target time window may be selected as the target monitoring occasion set, or the last complete PEI monitoring occasion set within the target time window may be selected as the target monitoring occasion set. In an embodiment, the terminal device may determine multiple PEI monitoring occasion sets within the target time window as the target monitoring occasion set.

Figure 10:
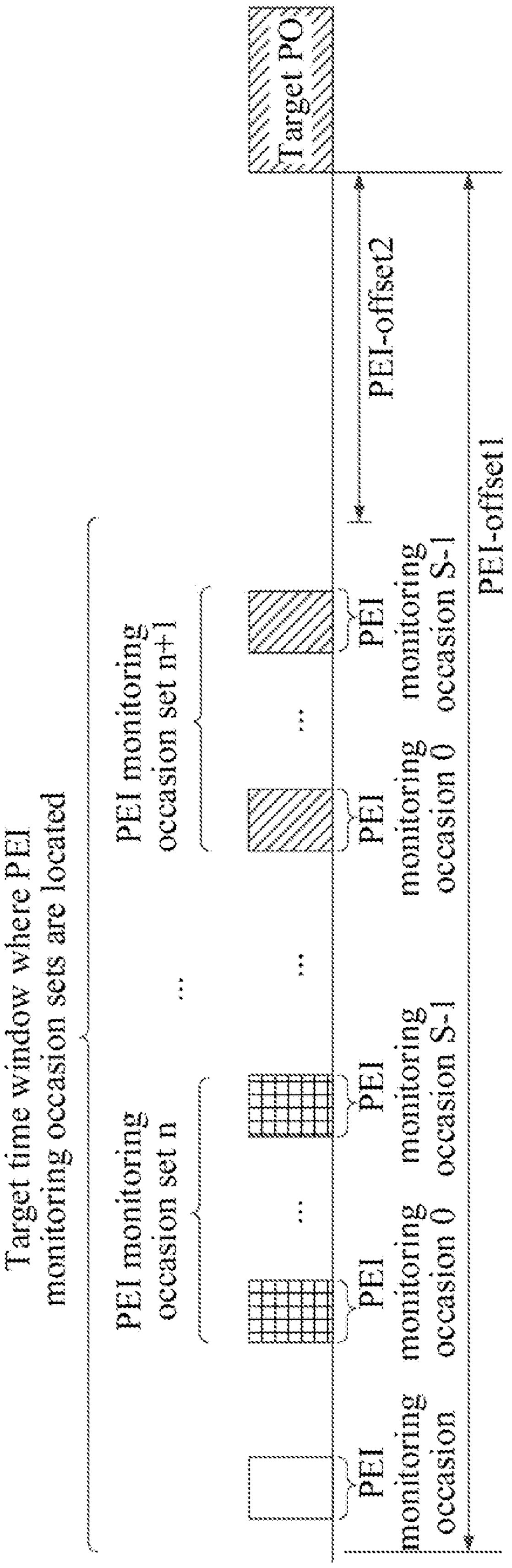
FIG. 10 is a third diagram of a PEI monitoring occasion set according to an embodiment of the present disclosure.

As illustrated in FIG. 10, the PEI monitoring occasions are determined by the configuration of the network, and the division of the PEI monitoring occasion sets is also determined by the configuration of the network. The terminal device determines one or more complete PEI monitoring occasion sets within the target time window as the target monitoring occasion set.

Figure 11:
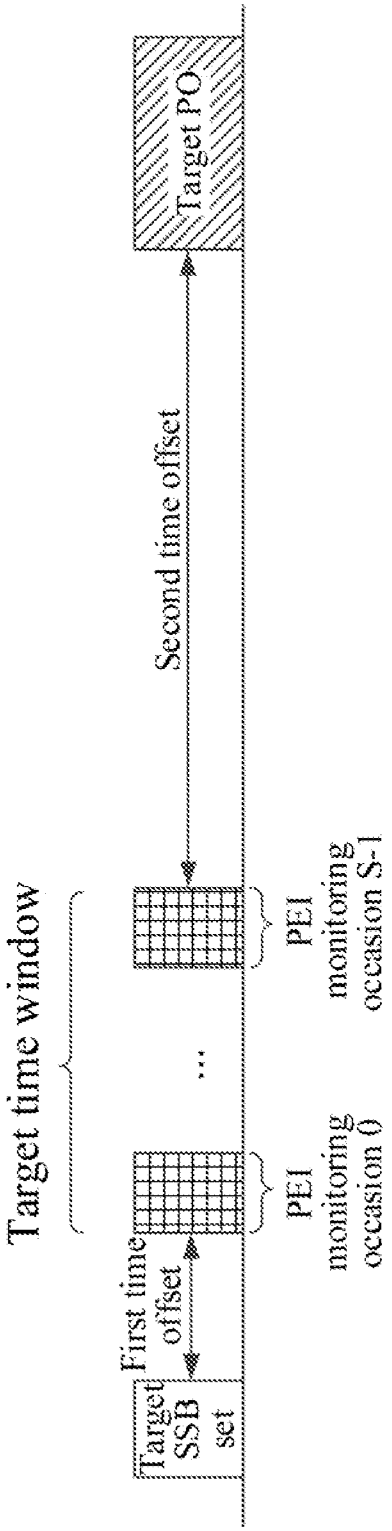
FIG. 11 is a diagram of a target time window according to an embodiment of the present disclosure.

It should be noted that with respect to the first application example and the second application example, the method for determining the target time window is not limited to the above-mentioned method of determining the target time window by the time offset relative to the target PO, but the target time window may be determined by other rules. For example, as illustrated in FIG. 11, a position of the target time window is determined by a first time offset between a start time of the target time window and an end time of the target SSB set, and a second time offset between an end time of the target time window and a start time of the target PO. In some alternative embodiments, the target SSB set is the M-th SSB set before the target PO, and M is a positive integer. In some alternative embodiments, P SSB sets exist between the target time window and the target PO, P is a positive integer, M=P, or M=P+1.

According to the technical solutions of the embodiments of the present disclosure, the terminal device can determine the position of the target monitoring occasion set for the power saving signal, here, S monitoring occasions in the target monitoring occasion set are associated with S beams, so that the terminal device can correctly determine Quasi Co Location (QCL) information corresponding to each monitoring occasion in the target monitoring occasion set, thereby adopting the correct beam to monitor the power saving signal on the corresponding monitoring occasion.

In the technical solutions of the embodiments of the present disclosure, the position of the monitoring occasion set for the PEI can be conveniently determined, so that the terminal device can correctly determine QCL information corresponding to each monitoring occasion in the monitoring occasion set for the PEI, that is, the corresponding SSB or the monitoring occasion for the corresponding paging PDCCH, thereby correctly receiving the PEI.

Preferred embodiments of the present disclosure are described in detail above with reference to the drawings, but the present disclosure is not limited to specific details in the above implementations. Within the scope of the technical concept of the present disclosure, a variety of simple variations may be made to the technical solutions of the present disclosure, and all of these simple variations fall within the scope of protection of the present disclosure. For example, various specific technical features described in the above specific implementations may be combined by using any suitable means without contradictions. To avoid unnecessary repetition, the present disclosure no longer describes the various possible combinations. For another example, any combination of different implementations of the present disclosure may also be made, as long as the same does not violate the ideas of the present disclosure, which should likewise be considered content disclosed in the present disclosure. For another example, insofar as there are no conflicts, various embodiments described in the present disclosure and/or technical features in various embodiments may be arbitrarily combined with the prior art, and the technical solutions obtained after the combination should also fall within the scope of protection of the present disclosure.

It should be understood that in various method embodiments of the present disclosure, the size of the sequence numbers of various processes described above does not imply the order of execution, and the order of execution of various processes should be determined by functions and internal logic thereof, and should not constitute any limitation on the implementation processes of the embodiments of the present disclosure. In addition, in the embodiments of the present disclosure, the terms "downlink", "uplink", and "sidelink" are used to denote the transmission direction of a signal or data, here, "downlink" is used to indicate that the transmission direction of the signal or data is a first direction of sending from a station to a user equipment of a cell, "uplink" is used to indicate that the transmission direction of the signal or data is a second direction of sending from the user equipment of the cell to the station, and "sidelink" is used to indicate that the transmission direction of the signal or data is a third direction of sending from user equipment 1 to user equipment 2. For example, a "downlink signal" indicates that the transmission direction of the signal is the first direction. In addition, in the embodiments of the present disclosure, the term "and/or" herein is merely to describe the associations of associated objects, indicating that there may be three kinds of relationships. Specifically, A and/or B may indicate three situations in which A exists alone, A and B exist simultaneously, or B exists alone. In addition, the character "/" herein generally indicates that the associated objects before and after this character are in an "or" relationship.

Figure 12:
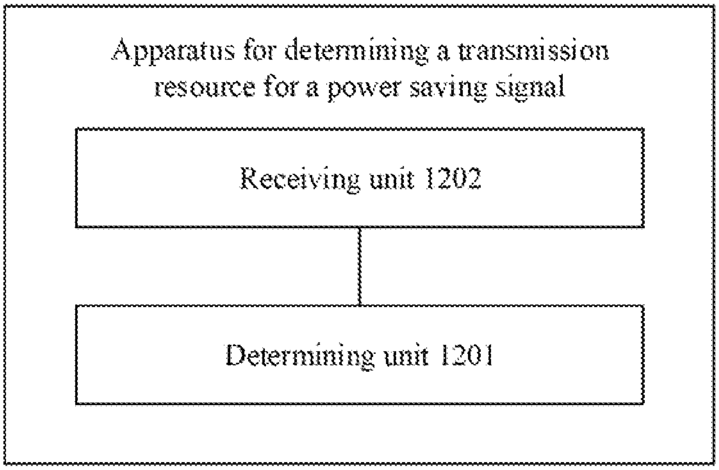
FIG. 12 is a diagram of structural composition of an apparatus for determining a transmission resource for a power saving signal according to an embodiment of the present disclosure.

FIG. 12 is a diagram of a structural composition of an apparatus for determining a transmission resource for a power saving signal according to an embodiment of the present disclosure, which is applied to a terminal device. As illustrated in FIG. 12, the apparatus for determining the transmission resource for the power saving signal includes a determining unit 1201.

The determining unit 1201 is configured to determine a target monitoring occasion set for the power saving signal. The target monitoring occasion set includes S monitoring occasions, and S is a positive integer.

In some alternative embodiments, the determining unit 1201 is configured to determine a target time window, and determine the S monitoring occasions within the target time window as the target monitoring occasion set.

In some alternative embodiments, the target time window includes M monitoring occasions, and M is an integer greater than or equal to S.

In some alternative embodiments, when M is greater than S, the determining unit 1201 is configured to determine the S monitoring occasions from the M monitoring occasions within the target time window, and determine the S monitoring occasions as the target monitoring occasion set.

In some alternative embodiments, the determining unit 1201 is configured to determine first S consecutive monitoring occasions from the M monitoring occasions within the target time window, and determine that the target monitoring occasion set includes the first S consecutive monitoring occasions. Alternatively, the determining unit 1201 is configured to determine last S consecutive monitoring occasions from the M monitoring occasions within the target time window, and determine that the target monitoring occasion set includes the last S consecutive monitoring occasions.

In some alternative embodiments, the determining unit 1201 is configured to determine a first target monitoring occasion, here, the first target monitoring occasion is a first monitoring occasion in the target monitoring occasion set; and determine that the target monitoring occasion set includes S consecutive monitoring occasions starting from the first monitoring occasion.

In some alternative embodiments, the apparatus further includes a receiving unit 1202 configured to receive first configuration information. The first configuration information is used to determine multiple monitoring occasion sets in a time cycle.

The determining unit 1201 is configured to determine the target monitoring occasion set from the multiple monitoring occasion sets.

In some alternative embodiments, the first configuration information includes at least one of: first information for indicating a number of the monitoring occasion sets included in the time cycle; second information for indicating a first monitoring occasion in each of the multiple monitoring occasion sets; or third information for indicating a number of monitoring occasions included in each of the multiple monitoring occasion sets.

In some alternative embodiments, the first configuration information includes at least one of: first information for indicating a number of the monitoring occasion sets included in the time cycle; third information for indicating a number of monitoring occasions included in each of the multiple monitoring occasion sets; fourth information for indicating a first monitoring occasion in a reference monitoring occasion set in the multiple monitoring occasion sets; or fifth information for indicating a positional relationship between the reference monitoring occasion set and another monitoring occasion set other than the reference monitoring occasion set, in the multiple monitoring occasion sets.

In some alternative embodiments, the first configuration information is carried in a system message.

In some alternative embodiments, the time cycle is a discontinuous reception (DRX) cycle or a paging cycle.

In some alternative embodiments, the determining unit 1201 is configured to determine, based on a first time relationship, the target monitoring occasion set from the multiple monitoring occasion sets. The first time relationship is a time relationship between the target monitoring occasion set and a target paging unit or a time relationship between the target monitoring occasion set and a target SSB set.

In some optional embodiments, the target monitoring occasion set is an L-th monitoring occasion set, located before the target paging unit, in the multiple monitoring occasion sets, here, L is a positive integer; or the target monitoring occasion set is a nearest monitoring occasion set, located before the target SSB set, in the multiple monitoring occasion sets; or the target monitoring occasion set is a nearest monitoring occasion set, located after the target SSB set, in the multiple monitoring occasion sets.

In some alternative embodiments, a value of L is network-configured or predefined.

In some alternative embodiments, the determining unit 1201 is configured to determine a target time window, here, the target time window includes at least one monitoring occasion set; and determine the target monitoring occasion set from the at least one monitoring occasion set within the target time window.

In some alternative embodiments, the determining unit 1201 is configured to determine that the target monitoring occasion set includes all of the at least one monitoring occasion set; or determine that the target monitoring occasion set includes part of the at least one monitoring occasion set.

In some alternative embodiments, the determining unit 1201 is configured to determine that the target monitoring occasion set is a first monitoring occasion set in the at least one monitoring occasion set; or determine that the target monitoring occasion set is a last monitoring occasion set in the at least one monitoring occasion set.

In some alternative embodiments, the determining unit 1201 is configured to determine the target time window based on a first configuration parameter.

In some alternative embodiments, the first configuration parameter includes at least one of: a first parameter for determining a start time of the target time window; a second parameter for determining an end time of the target time window; or a third parameter for determining a duration of the target time window In some alternative embodiments, the first parameter is used to indicate an offset of the start time of the target time window relative to a reference time of a target paging unit. Alternatively, the first parameter is used to indicate an offset of the start time of the target time window relative to a reference time of a target SSB set.

In some alternative embodiments, the second parameter is used to indicate an offset of the end time of the target time window relative to a reference time of a target paging unit. Alternatively, the second parameter is used to indicate an offset of the end time of the target time window relative to a reference time of a target SSB set.

In some alternative embodiments, the target paging unit is a paging occasion (PO) or paging frame (PF) corresponding to the terminal device.

In some alternative embodiments, the determination unit 1201 is configured to determine the target SSB set based on a second time relationship. The second time relationship is a time relationship between the target SSB set and the target paging unit.

In some alternative embodiments, the target SSB set is an M-th SSB set before the target paging unit, and M is a positive integer.

In some alternative embodiments, P SSB sets exist between the target monitoring occasion set and the target paging unit, P is a positive integer, and M=P or M=P+1.

In some alternative embodiments, a value of M is network-configured or predefined.

In some alternative embodiments, the power saving signal is carried by a physical downlink control channel (PDCCH), and the monitoring occasions are monitoring occasions for the PDCCH.

In some alternative embodiments, the power saving signal is carried by a reference signal, and the monitoring occasions are the transmission occasions for the reference signal.

In some alternative embodiments, the reference signal includes at least one of: a tracking reference signal (TRS), a channel state information-reference signal (CSI-RS) or a secondary synchronization signal (SSS).

In some alternative embodiments, the power saving signal is a paging early indication (PEI) signal.

Those skilled in the art will appreciate that the description relevant to the apparatuses for determining the monitoring occasion for the power saving signal according to the embodiments of the present disclosure may be understood with reference to the description relevant to the methods for determining the monitoring occasion for the power saving signal according to the embodiments of the present disclosure.

Figure 13:
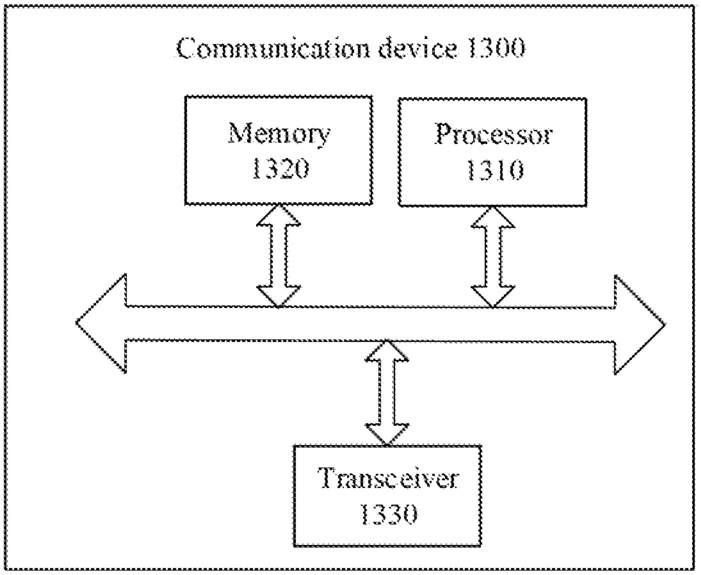
FIG. 13 is a structural diagram of a communication device according to an embodiment of the present disclosure.

FIG. 13 is a diagram of a structure of a communication device 1300 according to an embodiment of the present disclosure. The communication device may be a terminal device. The communication device 1300 illustrated in FIG. 13 includes a processor 1310. The processor 1310 can invoke and run a computer program from a memory to implement the methods in the embodiments of the present disclosure.

In an embodiment, as illustrated in FIG. 13, the communication device 1300 may further include a memory 1320. The processor 1310 may invoke and run a computer program from the memory 1320 to implement the methods in the embodiments of the present disclosure.

The memory 1320 may be a separate device independent of the processor 1310 or may be integrated in the processor 1310.

In an embodiment, as illustrated in FIG. 13, the communication device 1300 may further include a transceiver 1330. The processor 1310 may control the transceiver 1330 to communicate with other devices. In particular, the processor 1310 may control the transceiver 1330 to transmit information or data to the other devices or receive information or data transmitted by the other devices.

The transceiver 1330 may include a transmitter and a receiver. The transceiver 1330 may further include antennas, the number of which may be one or more.

In an embodiment, the communication device 1300 may be specifically a network device according to the embodiments of the present disclosure, and the communication device 1300 may implement corresponding processes implemented by the network device in various methods according to the embodiments of the present disclosure. For the sake of brevity, details are not described herein again.

In an embodiment, the communication device 1300 may be specifically a mobile terminal/terminal device according to the embodiments of the present disclosure, and the communication device 1300 may implement corresponding processes implemented by the mobile terminal/terminal device in various methods according to the embodiments of the present disclosure. For the sake of brevity, details are not described herein again.

Figure 14:
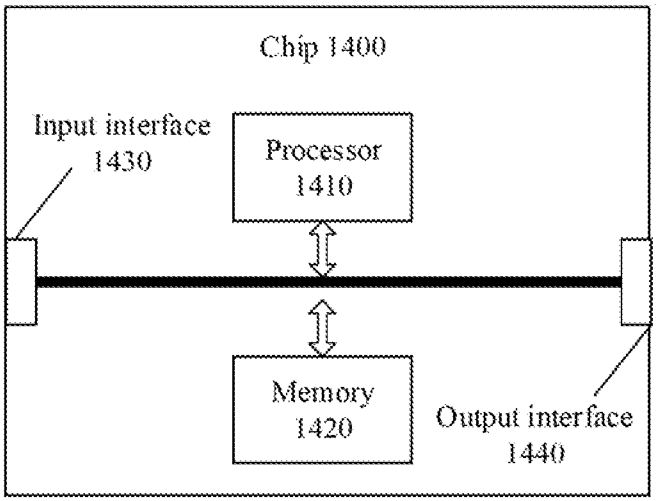
FIG. 14 is a structural diagram of a chip according to an embodiment of the present disclosure.

FIG. 14 is a structural diagram of a chip according to an embodiment of the present disclosure. The chip 1400 illustrated in FIG. 14 includes a processor 1410. The processor can invoke and run a computer program from a memory to implement the methods in the embodiments of the present disclosure.

In an embodiment, as illustrated in FIG. 14, the chip 1400 may further include a memory 1420. The processor 1410 may invoke and run a computer program from the memory 1420 to implement the methods in the embodiments of the present disclosure.

The memory 1420 may be a separate device independent of the processor 1410 or may be integrated in the processor 1410.

In an embodiment, the chip 1400 may further include an input interface 1430. The processor 1410 may control the input interface 1430 to communicate with other devices or chips. In particular, the processor 1410 may obtain information or data transmitted by other devices or chips.

In an embodiment, the chip 1400 may further include an output interface 1440. The processor 1410 may control the output interface 1440 to communicate with other devices or chips. In particular, the processor 1410 may output information or data to other devices or chips.

In an embodiment, the chip can be applied to the network device in the embodiments of the present disclosure, and the chip can perform respective processes implemented by the network device in various methods according to the embodiments of the present disclosure. For the sake of brevity, details are not described herein again.

In an embodiment, the chip can be applied to the mobile terminal/terminal device in the embodiments of the present disclosure, and the chip can perform respective processes implemented by the mobile terminal/terminal device in various methods according to the embodiments of the present disclosure. For the sake of brevity, details are not described herein again.

It should be understood that the chip referred to in the embodiments of the present disclosure may also be referred to as a system-level chip, a system chip, a chip system, or a system-on-chip and the like.

Figure 15:
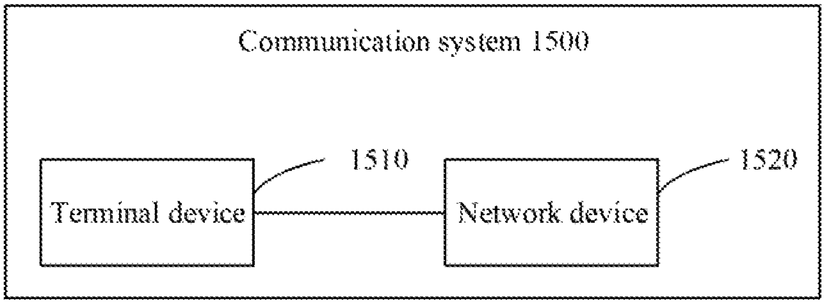
FIG. 15 is a block diagram of a communication system according to an embodiment of the present disclosure.

FIG. 15 is a block diagram of a communication system 1500 according to an embodiment of the present disclosure. As illustrated in FIG. 15, the communication system 1500 includes a terminal device 1510 and a network device 1520.

The terminal device 1510 may be used to implement the corresponding functions implemented by the terminal device in the above methods, and the network device 1520 may be used to implement the corresponding functions implemented by the network device in the above methods. For the sake of brevity, details are not described herein again.

It is to be understood that the processor in the embodiments of the present disclosure may be an integrated circuit chip and has a signal processing capability. In an implementation, various operations in the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or other programmable logical device, a discrete gate or a transistor logical device, or a discrete hardware component, which may implement or perform the various methods, operations and logical block diagrams disclosed in the embodiments of the present disclosure. The universal processor may be a microprocessor, or the processor may also be any conventional processor and the like. The operations of the methods disclosed in combination with the embodiments of the present disclosure may be directly embodied as being executed and completed by a hardware decoding processor, or being executed and completed by a combination of hardware and software modules in the decoding processor. The software modules may be located in a mature storage medium in the art, such as a Random Access Memory (RAM), a flash memory, a Read-Only memory (ROM), a Programmable ROM (PROM), Electrically Erasable PROM (EEPROM), or a register. The storage medium is located in a memory, the processor reads information in the memory, and completes operations of the methods in combination with hardware.

It can be understood that the memory in the embodiments of the present disclosure may be a volatile memory or a nonvolatile memory, or may include both volatile and nonvolatile memories. The nonvolatile memory may be a ROM, a PROM, an Erasable PROM (EPROM), an Electrically EPROM (EEPROM), or a flash memory. The volatile memory may be a RAM, and is used as an external high-speed cache. By way of exemplary illustration but not limitation, RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It is to be noted that the memory in the systems and methods described in the present disclosure is intended to include, but is not limited to, memories of these and any other proper types.

It should be understood that the foregoing memory is exemplary rather than limiting. For example, the memory in the embodiments of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), a Direct Rambus RAM (DR RAM), among others. That is to say, the memory in the embodiments of the present disclosure is intended to include but is not limited to those and any other suitable types of memories.

An embodiment of the present disclosure further provides a computer-readable storage medium. The computer-readable storage medium is configured to store a computer program.

In an embodiment, the computer-readable storage medium may be applied to the network device in the embodiments of the present disclosure, and the computer program causes a computer to perform respective processes implemented by the network device in various methods according to the embodiments of the present disclosure. For the sake of brevity, details are not described herein again.

In an embodiment, the computer-readable storage medium may be applied to the mobile terminal or terminal device in the embodiments of the present disclosure, and the computer program causes a computer to perform respective processes implemented by the mobile terminal or terminal device in various methods according to the embodiments of the present disclosure. For the sake of brevity, details are not described herein again.

An embodiment of the present disclosure further provides a computer program product that includes computer program instructions.

In an embodiment, the computer program product may be applied to the network device in the embodiments of the present disclosure, and the computer program instructions cause a computer to perform respective processes implemented by the network device in various methods according to the embodiments of the present disclosure. For the sake of brevity, details are not described herein again.

In an embodiment, the computer program product may be applied to the mobile terminal or terminal device in the embodiments of the present disclosure, and the computer program instructions cause a computer to perform respective processes implemented by the mobile terminal or terminal device in various methods according to the embodiments of the present disclosure. For the sake of brevity, details are not described herein again.

An embodiment of the present disclosure further provides a computer program.

In an embodiment, the computer program may be applied to the network device in the embodiments of the present disclosure. When being run on a computer, the computer program causes the computer to perform respective processes implemented by the network device in various methods according to the embodiments of the present disclosure. For the sake of brevity, details are not described herein again.

In an embodiment, the computer program may be applied to the mobile terminal or terminal device in the embodiments of the present disclosure. When being run on a computer, the computer program causes the computer to perform respective processes implemented by the mobile terminal or terminal device in various methods according to the embodiments of the present disclosure. For the sake of brevity, details are not described herein again.

Those of ordinary skill in the art will appreciate that the exemplary units and algorithm operations described in connection with the embodiments disclosed herein may be performed by electronic hardware or a combination of electronic hardware and computer software. Whether the functions are implemented by hardware or software depends on particular applications and design constraints of the technical solutions. A person skilled in the art may use a different method to implement the described functions for each of the particular applications, and such implementation should not be considered as going beyond the protection scope of the present disclosure.

It may be clearly understood by a person skilled in the art that for the purpose of convenient and brief description, with respect to the detailed working process of the system, apparatuses, and unit, reference may be made to a corresponding process in the foregoing method embodiments, details of which are not described herein again.

According to the embodiments provided by the present disclosure, it should be understood that the disclosed systems, apparatuses, and methods may be implemented in other ways. For example, the apparatus embodiments described above are merely illustrative. For example, the division of units is only a kind of logical function division. In practice implementations, there may be other division manners. For example, multiple units or components may be combined or integrated into another system, or some features may be ignored or not performed. In addition, the illustrated or discussed mutual coupling or direct coupling or communication connection may be indirect coupling or communication connection through some interfaces, apparatuses or units, and may be in electrical, mechanical or other forms.

The units described as separated parts may be or may not be physically separated, and the parts displayed as units may be or may not be physical units. That is, the units may be located in one place, or may be distributed over multiple network units. Some or all of the units may be selected according to actual needs so as to achieve the objectives of the solutions in the embodiments.

In addition, various functional units in various embodiments of the present disclosure may be integrated in one processing unit, or the units may exist separately physically, or two or more units may be integrated in one unit.

The functions may also be stored in a computer-readable storage medium if being implemented in the form of software functional unit and sold or used as an independent product. Based on such understanding, the technical solution of the present disclosure in essence or the part that contributes to the prior art or the part of the technical solution may be embodied in the form of software product. The computer software product is stored in a storage medium, and includes instructions to cause a computer device (which may be a personal computer, a server, or a network device, etc.) to perform all or part of operations of the methods described in the various embodiments of the present disclosure. The foregoing storage medium includes any medium that is capable of storing program codes, such as a USB disk, a mobile hard disk, a Read Only Memory (ROM), a Random Access Memory (RAM), a magnetic disk, an optical disk, or the like.

Those described above are merely specific embodiments of the present disclosure, and the protection scope of the present disclosure is not limited thereto. Any change or substitution that is readily conceived of by a person skilled in the art within the technical scope disclosed in the present disclosure shall fall within the protection scope of the present disclosure. Therefore, the protection scope of the present disclosure shall be defined by the appended claims.

The invention claimed is:

1. A method for determining a transmission resource for a power saving signal, comprising:

receiving, by a terminal device, first configuration information carried in a system message, the first configuration information being used to determine a plurality of monitoring occasion sets in a time cycle, and the time cycle being a discontinuous reception (DRX) cycle or a paging cycle; and determining, by the terminal device, a target monitoring occasion set for the power saving signal from the plurality of monitoring occasion sets, wherein the target monitoring occasion set comprises S monitoring occasions, and S is a positive integer.

2. The method of claim 1, wherein determining, by the terminal device, the target monitoring occasion set for the power saving signal comprises:

determining, by the terminal device, a first target monitoring occasion, the first target monitoring occasion being a first monitoring occasion in the target monitoring occasion set; and determining, by the terminal device, that the target monitoring occasion set comprises S consecutive monitoring occasions starting from the first monitoring occasion.

3. The method of claim 1, wherein the first configuration information comprises at least one of:

first information for indicating a number of the monitoring occasion sets comprised in the time cycle;

second information for indicating a first monitoring occasion in each of the plurality of monitoring occasion sets; or third information for indicating a number of monitoring occasions comprised in each of the plurality of monitoring occasion sets.

4. The method of claim 1, wherein determining, by the terminal device, the target monitoring occasion set from the plurality of monitoring occasion sets comprises:

determining, by the terminal device, based on a first time relationship, the target monitoring occasion set from the plurality of monitoring occasion sets, wherein the first time relationship is a time relationship between the target monitoring occasion set and a target paging unit or a time relationship between the target monitoring occasion set and a target synchronization signal/physical broadcast channel block (SSB) set, wherein the target paging unit is a paging occasion (PO) or paging frame (PF) corresponding to the terminal device.

5. The method of claim 4, wherein the target monitoring occasion set is an L-th monitoring occasion set, located before the target paging unit, in the plurality of monitoring occasion sets, wherein L is a positive integer and a value of L is network-configured or predefined; or the target monitoring occasion set is a nearest monitoring occasion set, located before the target SSB set, in the plurality of monitoring occasion sets; or the target monitoring occasion set is a nearest monitoring occasion set, located after the target SSB set, in the plurality of monitoring occasion sets.

6. The method of claim 1, further comprising:

determining, by the terminal device, a target time window, the target time window comprising at least one monitoring occasion set; and determining, by the terminal device, the target monitoring occasion set from the plurality of monitoring occasion sets comprises: determining, by the terminal device, the target monitoring occasion set from the at least one monitoring occasion set within the target time window.

7. The method of claim 6, wherein determining, by the terminal device, the target time window comprises:

determining, by the terminal device, the target time window based on a first configuration parameter.

8. The method of claim 1, wherein the power saving signal is carried by a physical downlink control channel (PDCCH), and the monitoring occasions are monitoring occasions for the PDCCH; and/or, the power saving signal is a paging early indication (PEI) signal.

9. A chip, comprising a processor configured to invoke and run a computer program from a memory to cause a terminal device installed with the chip to perform the method of claim 1.

10. A terminal device, comprising:

a processor; and a memory for storing a computer program that, when executed by the processor, causes the terminal device to:

receive first configuration information carried in a system message, the first configuration information being used to determine a plurality of monitoring occasion sets in a time cycle, and the time cycle being a discontinuous reception (DRX) cycle or a paging cycle; and determine a target monitoring occasion set for a power saving signal from the plurality of monitoring occasion sets, wherein the target monitoring occasion set comprises S monitoring occasions, and S is a positive integer.

11. The terminal device of claim 10, wherein the processor is configured to execute the computer program to cause the terminal device to:

determine a first target monitoring occasion, the first target monitoring occasion being a first monitoring occasion in the target monitoring occasion set; and determine that the target monitoring occasion set comprises S consecutive monitoring occasions starting from the first monitoring occasion.

12. The terminal device of claim 10, wherein the first configuration information comprises at least one of:

first information for indicating a number of the monitoring occasion sets comprised in the time cycle;

second information for indicating a first monitoring occasion in each of the plurality of monitoring occasion sets; or third information for indicating a number of monitoring occasions comprised in each of the plurality of monitoring occasion sets.

13. The terminal device of claim 10, wherein the processor is configured to execute the computer program to cause the terminal device to:

determine, based on a first time relationship, the target monitoring occasion set from the plurality of monitoring occasion sets, wherein the first time relationship is a time relationship between the target monitoring occasion set and a target paging unit or a time relationship between the target monitoring occasion set and a target synchronization signal/physical broadcast channel block (SSB) set, wherein the target paging unit is a paging occasion (PO) or paging frame (PF) corresponding to the terminal device.

14. The terminal device of claim 13, wherein the target monitoring occasion set is an L-th monitoring occasion set, located before the target paging unit, in the plurality of monitoring occasion sets, wherein L is a positive integer and a value of L is network-configured or predefined; or the target monitoring occasion set is a nearest monitoring occasion set, located before the target SSB set, in the plurality of monitoring occasion sets; or the target monitoring occasion set is a nearest monitoring occasion set, located after the target SSB set, in the plurality of monitoring occasion sets.

15. The terminal device of claim 10, wherein the processor is configured to execute the computer program to cause the terminal device to:

determine a target time window, the target time window comprising at least one monitoring occasion set; and determine the target monitoring occasion set from the at least one monitoring occasion set within the target time window.

16. The terminal device of claim 15, wherein the processor is configured to execute the computer program to cause the terminal device to determine the target time window based on a first configuration parameter.

17. The terminal device of claim 16, wherein the first configuration parameter comprises at least one of:

a first parameter for determining a start time of the target time window;

a second parameter for determining an end time of the target time window; or a third parameter for determining a duration of the target time window.

18. The terminal device of claim 10, wherein the power saving signal is carried by a physical downlink control channel (PDCCH), and the monitoring occasions are monitoring occasions for the PDCCH; and/or, the power saving signal is a paging early indication (PEI) signal.

19. A network device, comprising:

a processor; and a memory for storing a computer program that, when executed by the processor, causes the network device to:

send, to a terminal device, first configuration information carried in a system message, the first configuration information being used to determine a plurality of monitoring occasion sets in a time cycle, to enable the terminal device to determine a target monitoring occasion set for a power saving signal from the plurality of monitoring occasion sets, wherein the time cycle is a discontinuous reception (DRX) cycle or a paging cycle, and the target monitoring occasion set comprises S monitoring occasions, and S is a positive integer.

20. The network device of claim 19, wherein the first configuration information comprises at least one of:

first information for indicating a number of the monitoring occasion sets comprised in the time cycle;

second information for indicating a first monitoring occasion in each of the plurality of monitoring occasion sets; or third information for indicating a number of monitoring occasions comprised in each of the plurality of monitoring occasion sets.

* * * * *